United States Patent
Eguchi et al.

(10) Patent No.: US 8,854,771 B1
(45) Date of Patent: Oct. 7, 2014

(54) HARD DISK DRIVE BYPASS CHANNEL HAVING A CLOSE-SIDED VOICE COIL MOTOR

(71) Applicant: HGST Netherlands B.V., Amsterdam (NL)

(72) Inventors: Hajime Eguchi, Fujisawa (JP); Takashi Kouno, Ibaraki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/858,791

(22) Filed: Apr. 8, 2013

(51) Int. Cl.
*G11B 5/55* (2006.01)

(52) U.S. Cl.
USPC ........................................ 360/264.7

(58) Field of Classification Search
USPC ........................................ 360/264.7
See application file for complete search history.

(56) References Cited

U.S. PATENT DOCUMENTS

| | | | |
|---|---|---|---|
| 5,907,453 A | 5/1999 | Wood et al. | |
| 5,956,203 A | 9/1999 | Schirle et al. | |
| 5,963,398 A * | 10/1999 | Tohkairin | 360/264.7 |
| 6,337,782 B1 | 1/2002 | Guerin et al. | |
| 6,507,462 B1 | 1/2003 | Gibbs et al. | |
| 6,628,475 B2 | 9/2003 | Nakamoto et al. | |
| 7,330,334 B2 * | 2/2008 | Shimizu et al. | 360/97.14 |
| 7,616,402 B2 | 11/2009 | Suwa et al. | |
| 7,936,533 B2 | 5/2011 | Chan et al. | |
| 8,004,790 B2 | 8/2011 | Chan et al. | |
| 2002/0181149 A1 * | 12/2002 | Shimizu et al. | 360/97.03 |
| 2003/0189785 A1 * | 10/2003 | Shimizu et al. | 360/97.03 |
| 2005/0219741 A1 * | 10/2005 | Shimizu et al. | 360/97.03 |
| 2009/0067085 A1 * | 3/2009 | Gross et al. | 360/97.02 |
| 2009/0268341 A1 | 10/2009 | Chan | |
| 2010/0188781 A1 | 7/2010 | Ono et al. | |

OTHER PUBLICATIONS

Sundaravadivelu, K, et al., "Flow Induced Slider Vibration in a Functional HDD: Influence of Air Shroud", Sep. 30, 2008, 2 pages.

* cited by examiner

*Primary Examiner* — Mark Blouin
(74) *Attorney, Agent, or Firm* — John D. Henkhaus

(57) ABSTRACT

Approaches to improving head positioning accuracy in a hard disk drive, by suppressing airflow disturbances that would otherwise cause unwanted component vibration, include a voice coil motor having a sidewall spanning a gap between the VCM upper yoke and lower yoke. This VCM sidewall also serves as the inner wall of a bypass channel, for diverting airflow away from the actuator arm and associated components.

13 Claims, 5 Drawing Sheets

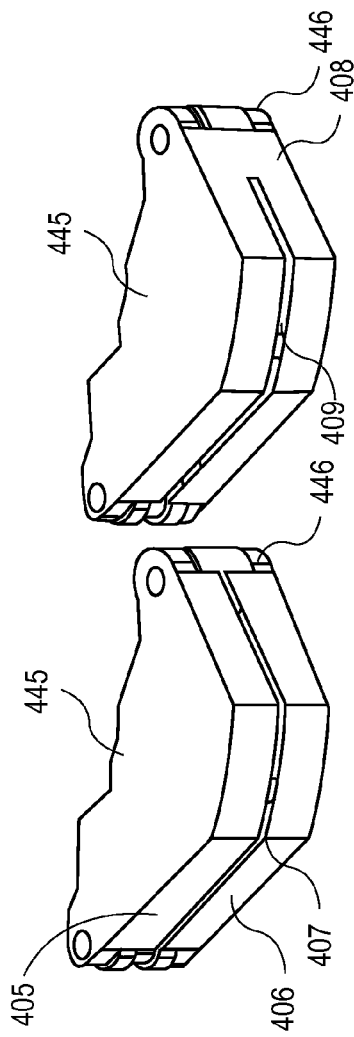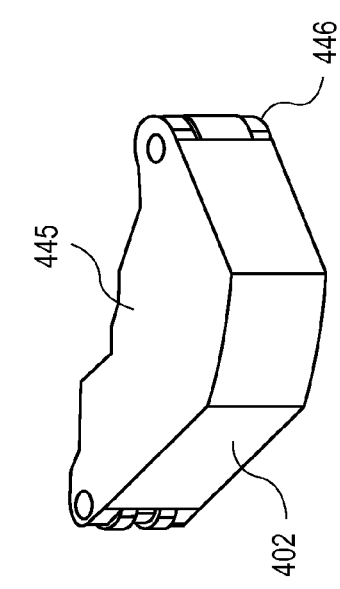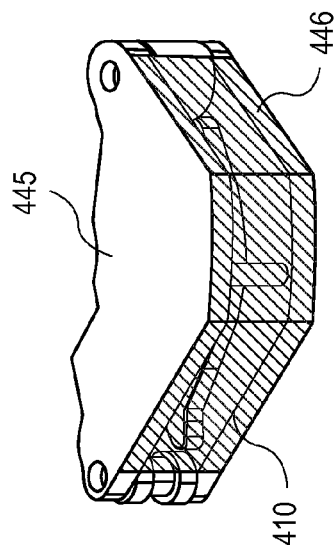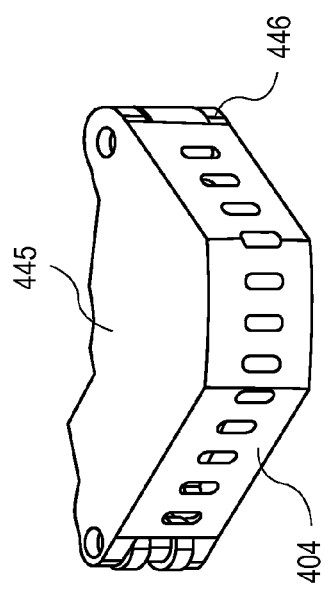

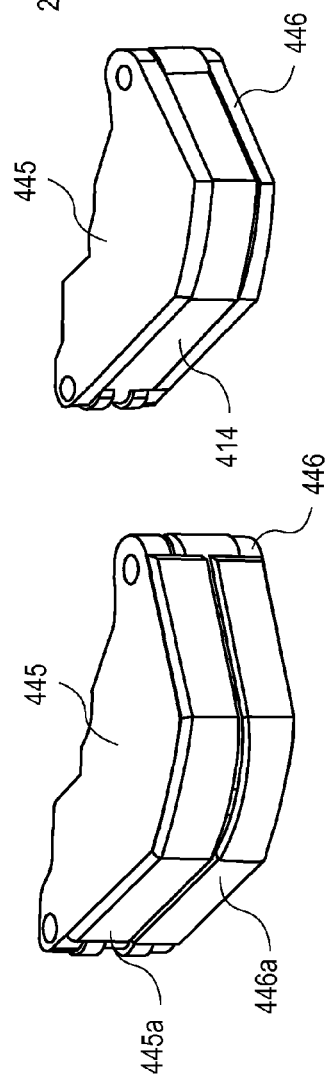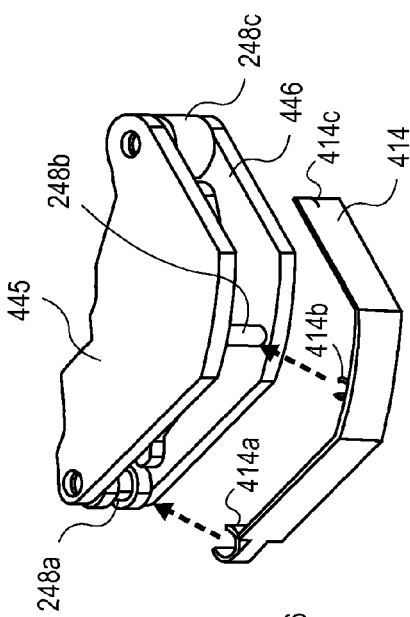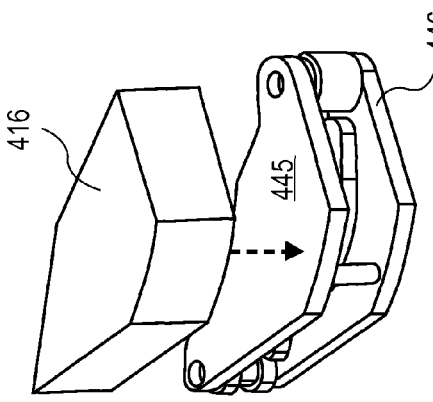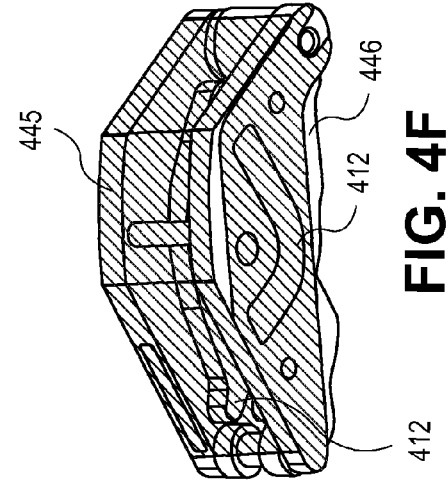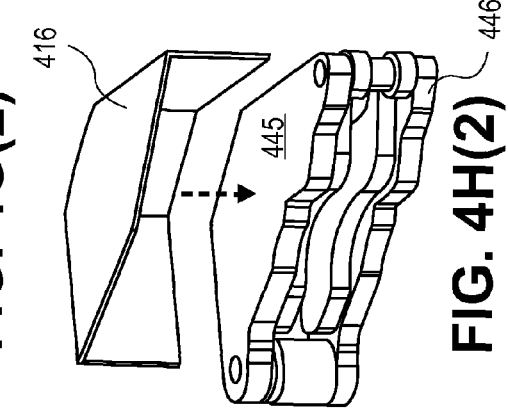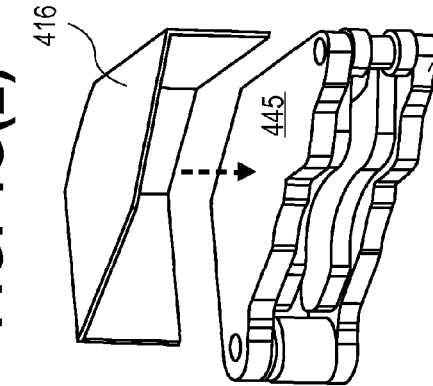
FIG. 4E
FIG. 4F
FIG. 4G(1)
FIG. 4G(2)
FIG. 4H(1)
FIG. 4H(2)

HARD DISK DRIVE BYPASS CHANNEL HAVING A CLOSE-SIDED VOICE COIL MOTOR

FIELD OF THE INVENTION

Embodiments of the invention relate generally to hard disk drives and more particularly to an airflow bypass channel for improved head positioning.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

As recording tracks in HDDs become narrower and narrower, there is a need for more accurate and sustainable head positioning. One of the main factors impairing accurate positioning is airflow caused by rotation of the disk which, when striking the arm supporting the head slider, causes the arm to vibrate and head positioning to suffer. Thus, the manner in which airflow disturbances are suppressed in order to restrict arm vibration is an important factor in improving positioning accuracy.

There is a known approach, referred to as a bypass channel, in which airflow that would otherwise strike the arm is diverted. Such a system is implemented using an airflow channel such that airflow flows outside the area of the disk, bypassing the arm. The airflow enters the channel upstream of the arm (e.g., at a 9 o'clock position on the disk) and returns to inside the disk area downstream of the arm (e.g., at a 3 o'clock position on the disk).

A bypass channel can be readily implemented into an HDD system in which the disk diameter is considerably smaller than the transverse width of the HDD base. However, in HDD systems in which the diameter of the disk is comparable with the transverse width of the base, it is difficult to maintain an adequate width for the flow channel due to space constraints within the HDD, and the effect of the fluid diversion action is inhibited. Furthermore, most of the air (or other gas) within the HDD is diverted with use of the known technologies, thereby making it difficult to cool the coil of the voice coil actuator. Thus, there is a risk that the coil temperature increases beyond its effective operating limit and, consequently, inhibits the actuator's seek performance.

SUMMARY OF EMBODIMENTS OF THE INVENTION

Embodiments of the invention are directed to improving head positioning accuracy in a hard disk drive by suppressing airflow disturbances that would otherwise cause unwanted actuator arm/suspension vibration.

According to an embodiment, a voice coil motor (VCM) that actuates the arm/suspension and moves the associated head slider for accessing portions of a disk, comprises a VCM sidewall spanning a gap between the VCM upper yoke and lower yoke. Notably, this VCM sidewall also serves as the inner wall of a bypass channel, for diverting airflow away from the actuator arm and associated components.

In order to maximize the width of the flow channel, the VCM sidewall that also serves as a wall of the bypass channel is produced by affixing a thin, sheet-like member to the side surface of the VCM, according to an embodiment. Various additional embodiments of a VCM sidewall are described herein, including a sidewall that comprises one or more openings for allowing air to flow to the VCM for cooling purposes, a sidewall that comprises filter material for operation as a recirculation filter, as well as sidewalls fabricated for manufacturing efficiency and ease.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4A is a perspective view of a close-sided voice coil motor, according to a first embodiment of the invention;

FIG. 4B is a perspective view of a close-sided voice coil motor, according to a second embodiment of the invention;

FIG. 4C(1) is a perspective view of a close-sided voice coil motor, according to a third embodiment of the invention;

FIG. 4C(2) is a perspective view of a close-sided voice coil motor, according to a fourth embodiment of the invention;

FIG. 4D is a perspective view of a close-sided voice coil motor, according to a fifth embodiment of the invention;

FIG. 4E is a perspective view of a close-sided voice coil motor, according to a sixth embodiment of the invention;

FIG. 4F is a perspective view of a close-sided voice coil motor, according to a seventh embodiment of the invention;

FIG. 4G(1) is a perspective view of a close-sided voice coil motor, according to a seventh embodiment of the invention;

FIG. 4G(2) is an exploded perspective view of the close-sided voice coil motor of FIG. 4G(1), according to the seventh embodiment of the invention;

FIG. 4H(1) is an exploded perspective view of a close-sided voice coil motor, according to an eighth embodiment of the invention; and FIG. 4H(2) is an exploded perspective view of the close-sided voice coil motor of FIG. 4H(1), according to the eighth embodiment of the invention.

DETAILED DESCRIPTION

Approaches to the configuration of a voice coil motor (VCM) comprising a close-sided VCM sidewall serving as the inner wall of a bypass channel, for diverting airflow away from the actuator arm and associated components, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
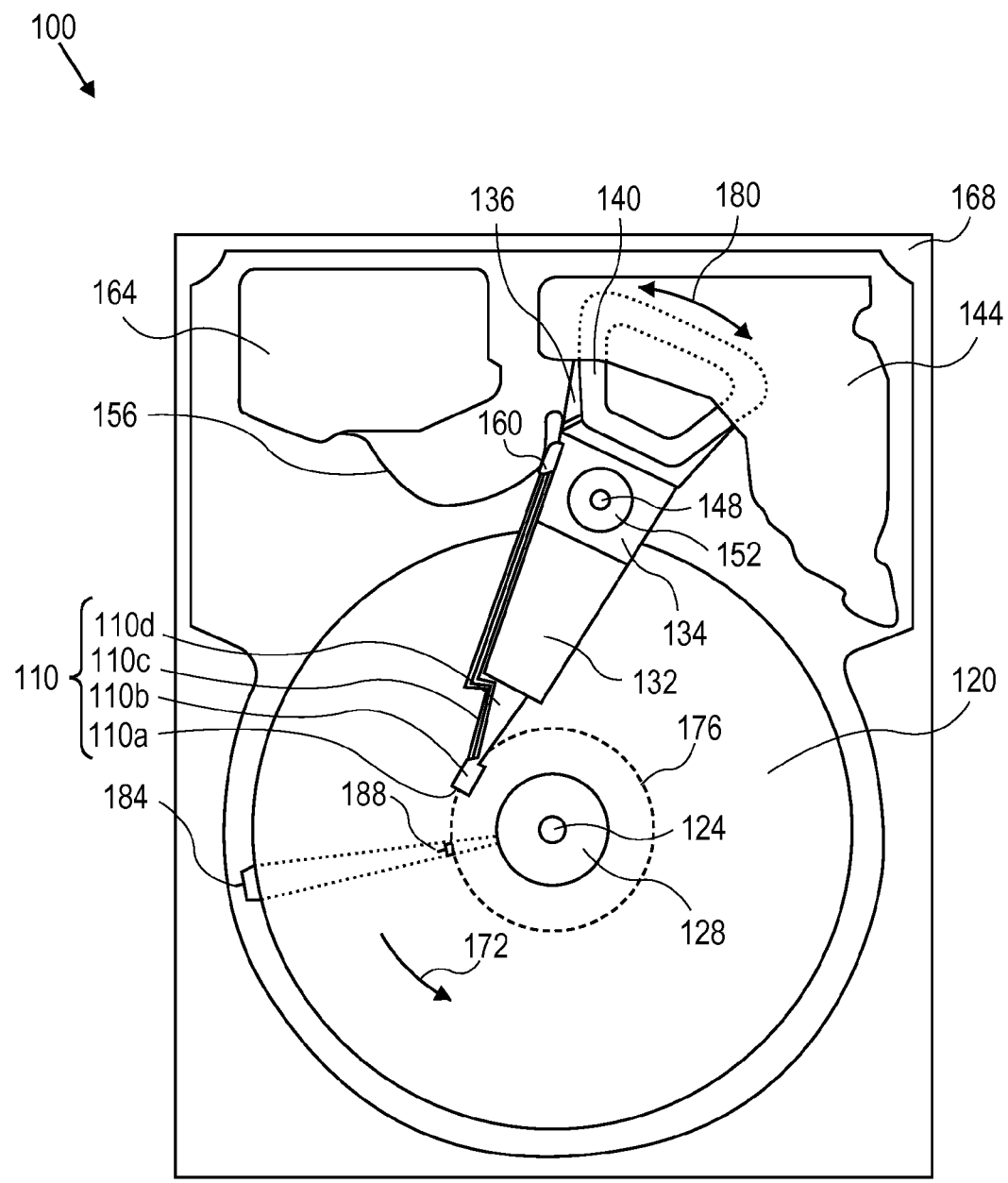
FIG. 1 is a plan view of an HDD, according to an embodiment of the invention.

Embodiments of the invention may be used in the context of a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
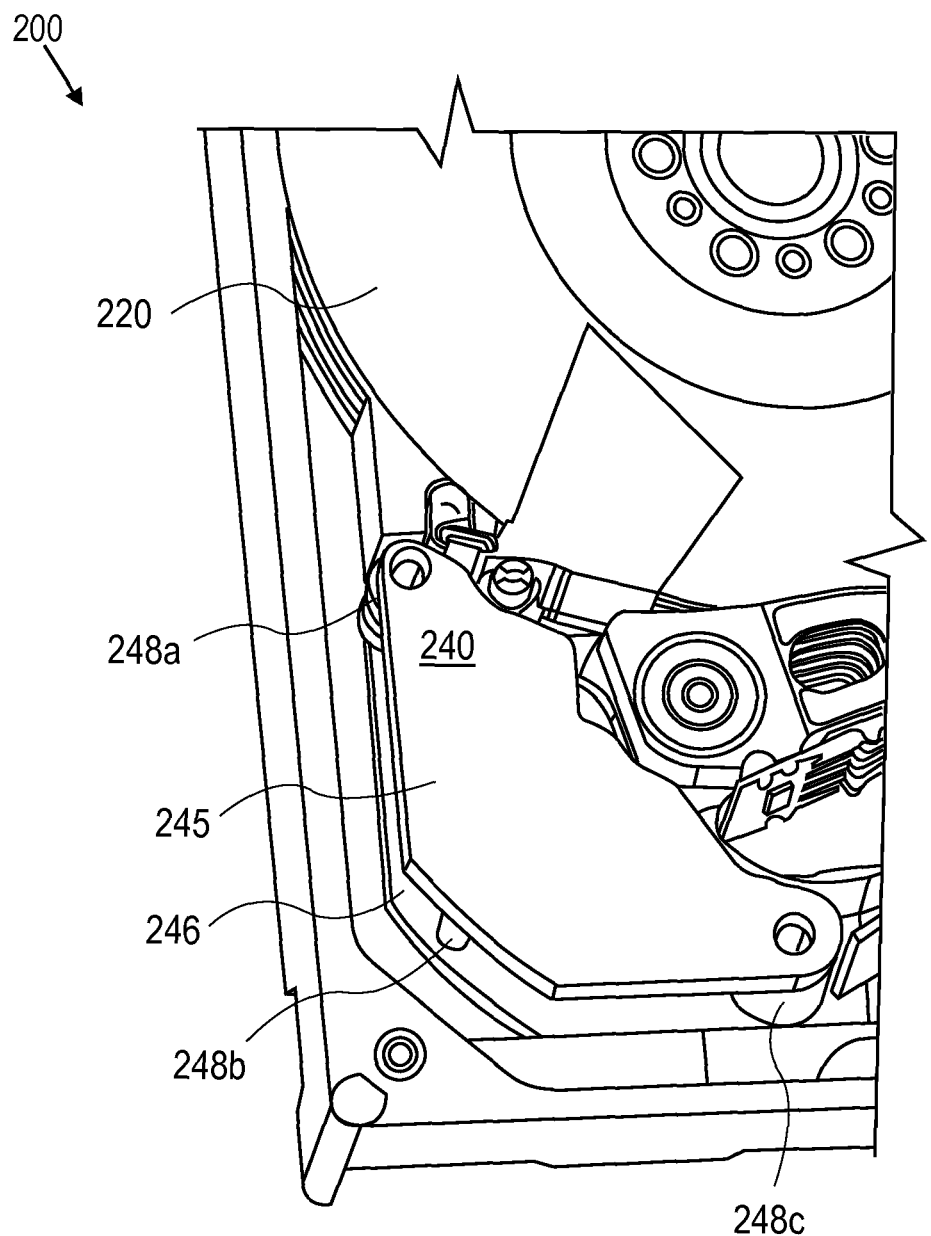
FIG. 2 is a partial perspective view of an HDD configured with an open-sided voice coil motor, according to an embodiment of the invention.

FIG. 2 is a partial perspective view of an HDD configured with an open-sided voice coil motor, according to an embodiment of the invention. A VCM 240 comprises an upper yoke 245 and a lower yoke 246 connected by one or more structural post 248a, 248b, 248c. The VCM comprises other operations sub-components that are not visible in FIG. 2. Note that the VCM 240 is open-sided, i.e., that there is an open gap between the upper yoke 245 and the lower yoke 246, such that airflow is free to travel through the gap and into the area around the arm (e.g., arm 132 of FIG. 1) and HGA (e.g., HGA 110 of FIG. 1). Consequently, the HDD 200 configuration would not be very effective in forcing airflow to bypass the critical area around the arm and HGA.

Introduction

Through the use of a bypass channel in an HDD, airflow that would otherwise strike the actuator arm and suspension is diverted. Bypass channels are often used in server-based HDD systems, in which there is a greater amount of airflow disturbance than with desktop-based and mobile-based HDD systems, primarily due to the typically faster disk rotation speed (e.g., 170-250 Hz for server in comparison with 120 Hz or less for desktop and mobile). Furthermore, in HDD systems in which the diameter of the disk is close to the transverse width of the base, such as with 3.5" form factor HDDs, it is difficult to maintain an adequate width for the flow channel due to space constraints within the HDD and the effect of the fluid diversion action is consequently inhibited.

Embodiments of the invention are directed to improving head positioning accuracy in a hard disk drive by suppressing airflow disturbances that would otherwise cause unwanted actuator arm/suspension vibration.

Bypass Channel with Close-Sided Voice Coil Motor

Figure 3:
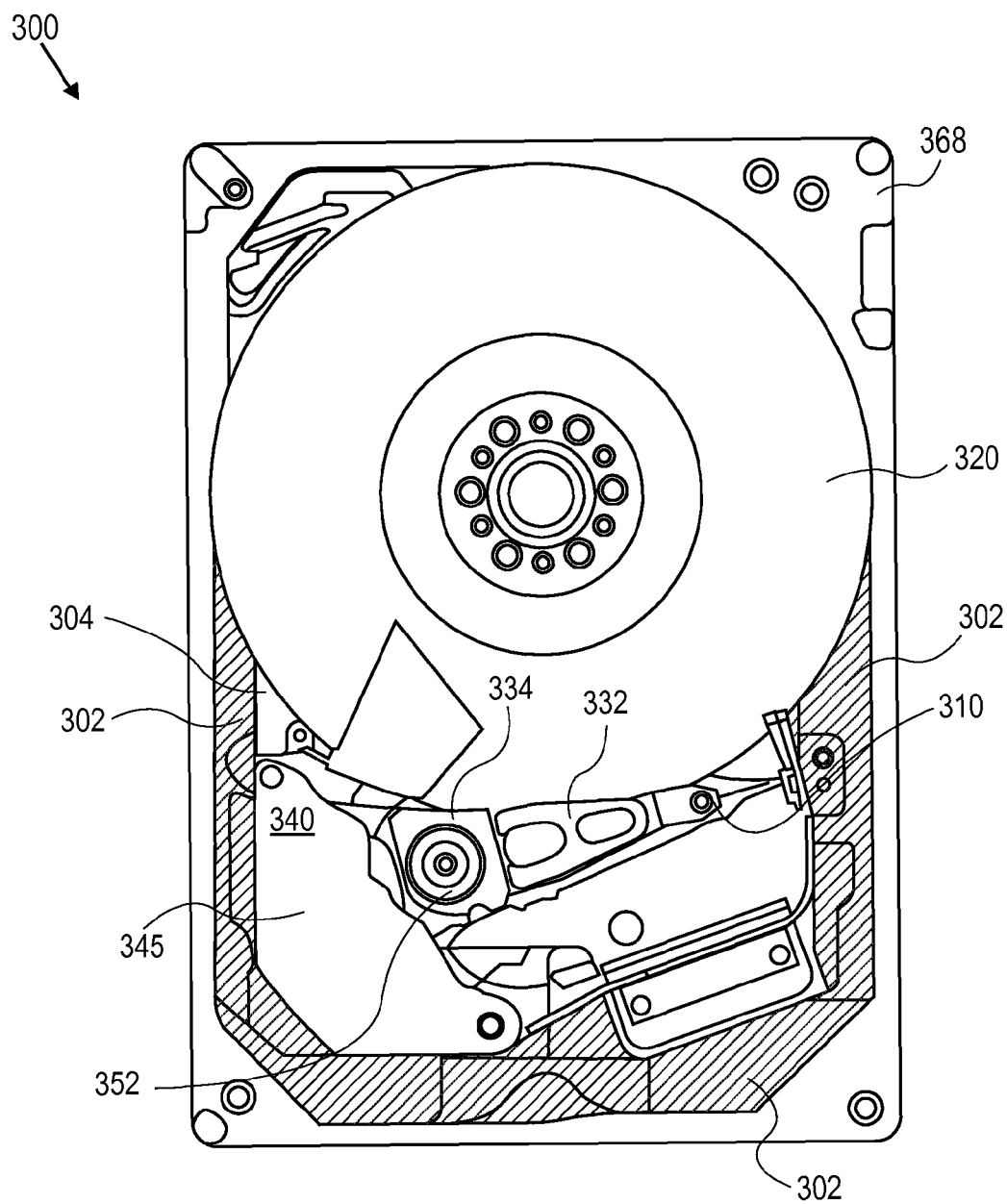
FIG. 3 is a plan view of an HDD configured with a bypass channel, according to an embodiment of the invention.

FIG. 3 is a plan view of an HDD configured with a bypass channel, according to an embodiment of the invention. Many of the components of HDD 300 are similar to HDD 100 of FIG. 1, so their descriptions are not repeated here in reference to FIG. 3. However, similar to HDD 100 of FIG. 1, HDD 300 includes a slider that includes a magnetic-reading/recording head and which, collectively, the slider and head may be referred to as a head slider.

The HDD 300 includes at least one head gimbal assembly (HGA) 310 including the head slider, a lead suspension attached to the head slider, and a load beam attached to the lead suspension. The HDD 300 also includes at least one magnetic-recording disk 320 rotatably mounted on a spindle. Note that the diameter of disk 320 is relatively large, almost equal to the width of HDD 300, which produces some space constraints with respect to the incorporation of a bypass channel. The HDD 300 further includes an arm 332 attached to the HGA 310, a carriage 334 attached to the arm 332, and a close-sided voice-coil motor (VCM) 340 that includes an upper yoke 345, a lower yoke 346, and a sidewall (see FIGS. 4A-4H). The armature of the VCM 340 is attached to the carriage 334 and is configured to move the arm 332 and the HGA 310 to access portions of the disk 320 being mounted on a pivot-shaft with an interposed pivot-bearing assembly 352.

According to an embodiment, HDD 300 includes an air blocker 304 to block or inhibit air (or other internal gas) from flowing between the disk 320 and the VCM 340 in such a manner to disturb the accurate positioning of the head due to vibrations induced in the arm 332 and the HGA 310. As such, air blocker 304 operates as part of inlet to a bypass channel 302, which provides a channel to divert airflow so that it bypasses the area around the arm 332 and HGA 310. Bypass channel 302 may be formed in part by attaching an HDD enclosure top to the HDD housing 368, possibly along with some gasket seals, to substantially close out the area illustrated as bypass channel 302 (cross-hatched). Also note that the bypass channel 302 is positioned around and adjacent to a portion of the VCM 240.

To close out the bypass channel 302 in order to implement a relatively and substantially airtight channel, embodiments of the invention include a close-sided VCM 340, in contrast with the open-sided VCM 240 of HDD 200. Embodiments of close-sided VCM 340 comprise a VCM sidewall that spans, and effectively closes out, the gap between the top yoke 345 and the bottom yoke (similar to bottom yoke 246 of FIG. 2). Thus, bypass channel 302 comprises an inner wall and an outer wall, where, e.g., the outer wall comprises a portion of HDD housing 368 and where the inner wall comprises the VCM sidewall (see FIGS. 4A-4H).

Embodiments of a Close-Sided Voice Coil Motor

FIG. 4A is a perspective view of a close-sided voice coil motor, according to a first embodiment of the invention. Shown in FIG. 4A is sidewall 402 that spans and closes out the gap between the top yoke 445 and the bottom yoke 446. Sidewall 402 is formed, for example, by affixing a thin, sheet-like member to the side surfaces of the VCM. According to an embodiment, sidewall 402 is attached to the top yoke 445 and to the bottom yoke 446. According to an embodiment, sidewall 402 is less than 1 mm thick in order to maximize the width of the bypass channel 302 (FIG. 3).

FIG. 4B is a perspective view of a close-sided voice coil motor, according to a second embodiment of the invention. Shown in FIG. 4B is sidewall 404 that spans the gap between the top yoke 445 and the bottom yoke 446 and includes one or more opening for allowing some limited cooling air to flow into the gap between the top yoke 445 and the bottom yoke 446. The one or more opening assists in cooling the VCM. According to an embodiment and as depicted in FIG. 4B, the one or more opening comprises a plurality of openings configured as a series of primarily vertical slots. According to another embodiment, the one or more opening comprises a plurality of openings configured as a series of primarily horizontal slots.

FIG. 4C(1) is a perspective view of a close-sided voice coil motor, according to a third embodiment of the invention. Shown in FIG. 4C(1) are sidewall 405 and sidewall 406 that collectively span the gap between the top yoke 445 and the bottom yoke 446, but for a slit 407 between sidewall 405 and sidewall 406. Slit 407 allows for some limited cooling air to flow into the gap between the top yoke 445 and the bottom yoke 446. The slit 407 assists in cooling the VCM.

FIG. 4C(2) is a perspective view of a close-sided voice coil motor, according to a fourth embodiment of the invention, which has a horizontal slit similar to the embodiment illustrated in FIG. 4C(1). Shown in FIG. 4C(2) is sidewall 408 that spans the gap between the top yoke 445 and the bottom yoke 446, but for a slit 409. Slit 409 allows for some limited cooling air to flow into the gap between the top yoke 445 and the bottom yoke 446. The slit 409 assists in cooling the VCM.

FIG. 4D is a perspective view of a close-sided voice coil motor, according to a fifth embodiment of the invention. Shown in FIG. 4D is sidewall 410 that spans and closes out the gap between the top yoke 445 and the bottom yoke 446. Sidewall 410 comprises filter material to function as a recirculation filter and to assist with cooling the VCM, allowing filtered airflow into the gap between the top yoke 445 and the bottom yoke 446. According to an embodiment, sidewall 410 is attached to the top yoke 445 and to the bottom yoke 446.

FIG. 4E is a perspective view of a close-sided voice coil motor, according to a sixth embodiment of the invention. Shown in FIG. 4E is top sidewall 445a and bottom sidewall 446a. Top sidewall 445a is fabricated as a unitary part with top yoke 445 and bottom sidewall 446a is fabricated as a unitary part with bottom yoke 446. According to an embodiment, top sidewall 445a and top yoke 445 are fabricated, for example, by bending a sheet of top yoke material, for ease of manufacturing and efficient part count. Similarly, bottom sidewall 446a and bottom yoke 446 are fabricated, for example, by bending a sheet of bottom yoke material.

FIG. 4F is a perspective view of a close-sided voice coil motor, according to a seventh embodiment of the invention. Shown in FIG. 4F is sidewall 412, which is fabricated as a unitary part with a bottom VCM sheet attached to bottom yoke 446. According to an embodiment, sidewall 412 is fabricated as an extension of a bottom VCM sheet, for ease of manufacturing and efficient part count. According to an embodiment, the VCM sheet from which sidewall 412 extends comprises a thin plastic film (e.g., 0.02 mm to 0.2 mm thick), and is used to reduce friction between the bottom yoke 446 and the base plate, such as housing 168 (FIG. 1).

FIG. 4G(1) is a perspective view of a close-sided voice coil motor, and FIG. 4G(2) is an exploded perspective view of the close-sided voice coil motor of FIG. 4G(1), according to a seventh embodiment of the invention. Shown in FIGS. 4G(1) and 4G(2) is sidewall 414, comprising a plurality of clasps configured to attach sidewall 414 to respective VCM post structures. For example, each clasp 414a, 414b, 414c (not visible) is configured to attach sidewall 414 to a respective post 248a, 248b, 248c coupling top yoke 445 to bottom yoke 446, for ease of assembly.

FIG. 4H(1) is an exploded perspective view of a close-sided voice coil motor, and FIG. 4H(2) is an exploded perspective view of the close-sided voice coil motor of FIG. 4H(1), according to the eighth embodiment of the invention. Shown in FIGS. 4H(1) and 4H(2) is sidewall encasing 416, comprising a sidewall configured as a unitary part with a casing that encases a portion of the VCM, for ease of assembly.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive (HDD), comprising:
   a head slider comprising a magnetic write head;
   an arm, to which said head slider is coupled;
   a magnetic-recording disk rotatably mounted on a spindle;
   a voice coil motor (VCM) configured to move the arm and head slider to access portions of the magnetic-recording disk, said voice coil motor comprising:
      a top yoke,
      a bottom yoke, and
      a VCM sidewall spanning a gap between said top and bottom yokes and attached to a side surface of said top yoke and to a side surface of said bottom yoke; and
   a bypass channel for diverting airflow away from said arm, said bypass channel comprising an inner wall and an outer wall, wherein said inner wall comprises said VCM sidewall.

2. The HDD of claim 1, wherein said VCM sidewall comprises one or more opening configured as a series of primarily vertical slots for allowing cooling airflow into said gap between said top and bottom yokes.

3. The HDD of claim 1, wherein said VCM sidewall comprises one or more opening configured as one or more horizontal slit for allowing cooling airflow into said gap between said top and bottom yokes.

4. The HDD of claim 1, wherein said VCM sidewall comprises a first partial sidewall extending from said top yoke and a second partial sidewall extending from said bottom yoke, and wherein said first and second partial sidewalls are separated by a horizontal slit for allowing cooling airflow into said gap between said top and bottom yokes.

5. The HDD of claim 1, wherein said VCM sidewall comprises a top partial sidewall being a unitary part with said top yoke and a bottom partial sidewall being a unitary part with said bottom yoke.

6. The HDD of claim 1, wherein said VCM sidewall comprises filter material for allowing filtered airflow into said gap between said top and bottom yokes.

7. A voice coil motor (VCM) for moving an arm and a head slider to access portions of a magnetic-recording disk, the VCM comprising:
   a top yoke attached to a top magnet,
   a bottom yoke attached to a bottom magnet, and
   a sidewall spanning a gap between said top and bottom yokes and attached to a side surface of said top yoke and to a side surface of said bottom yoke, wherein said sidewall constitutes an inner wall of a bypass channel for diverting airflow away from said arm.

8. The VCM of claim 7, wherein said sidewall comprises one or more opening configured as a series of primarily vertical slots for allowing cooling airflow into said gap between said top and bottom yokes.

9. The VCM of claim 7, wherein said sidewall comprises one or more opening configured as one or more horizontal slit for allowing cooling airflow into said gap between said top and bottom yokes.

10. The VCM of claim 7, wherein said sidewall comprises a first partial sidewall extending from said top yoke and a second partial sidewall extending from said bottom yoke, and wherein said first and second partial sidewalls are separated by a horizontal slit for allowing cooling airflow into said gap between said top and bottom yokes.

11. The VCM of claim 7, wherein said sidewall comprises a top partial sidewall being a unitary part with said top yoke and a bottom partial sidewall being a unitary part with said bottom yoke.

12. The VCM of claim 7, wherein said sidewall comprises filter material for allowing filtered airflow into said gap between said top and bottom yokes.

13. A hard disk drive (HDD), comprising:
   a head slider comprising a magnetic write head;
   an arm, to which said head slider is coupled;
   a magnetic-recording disk rotatably mounted on a spindle;
   a voice coil motor (VCM) configured to move the arm and head slider to access portions of the magnetic-recording disk, said voice coil motor comprising:
      a top yoke,
      a bottom yoke, and
      a VCM sidewall spanning a gap between said top and bottom yokes and comprising one or more opening for allowing cooling airflow into said gap between said top and bottom yokes, wherein said one or more opening is configured as a series of primarily vertical slots or as one or more horizontal slit; and
   a bypass channel for diverting airflow away from said arm, said bypass channel comprising an inner wall and an outer wall, wherein said inner wall comprises said VCM sidewall.

\* \* \* \* \*